(12) United States Patent
Oh

(10) Patent No.: US 7,505,469 B2
(45) Date of Patent: Mar. 17, 2009

(54) METHOD FOR REPORTING TRANSMISSION STATE BY INTERNET PROTOCOL AND NETWORK USING THE SAME

(75) Inventor: Youn-Taek Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 669 days.

(21) Appl. No.: 11/263,046

(22) Filed: Oct. 31, 2005

(65) Prior Publication Data
US 2006/0104272 A1    May 18, 2006

(30) Foreign Application Priority Data
Nov. 15, 2004    (KR) ..................... 10-2004-0093081

(51) Int. Cl.
*H04L 12/56*    (2006.01)
(52) U.S. Cl. ................... 370/395.52; 370/230; 370/235
(58) Field of Classification Search ........................ None
See application file for complete search history.

(56) References Cited

U.S. PATENT DOCUMENTS 6,847,994 B1 *  1/2005  Akimoto et al. ............. 709/223
7,366,093 B2 *  4/2008  Alfano et al. ............... 370/229

OTHER PUBLICATIONS

Postel, Internet Control Message Protocol, Request for comment 777, 14 pages, 1981.*
Conta et al, Internet Control Message Protocol (ICMPv6) for the Internet Protocol Version 6 (IPv6) Specification, Request for comment 2463, 18 pages, 1998.*

* cited by examiner

*Primary Examiner*—Frank Duong
(74) *Attorney, Agent, or Firm*—The Farrell Law Firm, PC

(57) ABSTRACT

Disclosed are a method for reporting a transmission state by an Internet protocol (IP) and a network system using the same. The method includes the steps of determining whether discard of any datagrams occurs, and if the discard of any datagram occurs, obtaining an address of a destination by parsing a discarded datagram, and transmitting an ICMP message for reporting an occurrence of the discard of the datagrams to the address of the destination. The network system includes a source for transmitting a datagram, a destination for receiving the datagram, and a router for performing routing between a network and the source or the destination.

6 Claims, 3 Drawing Sheets

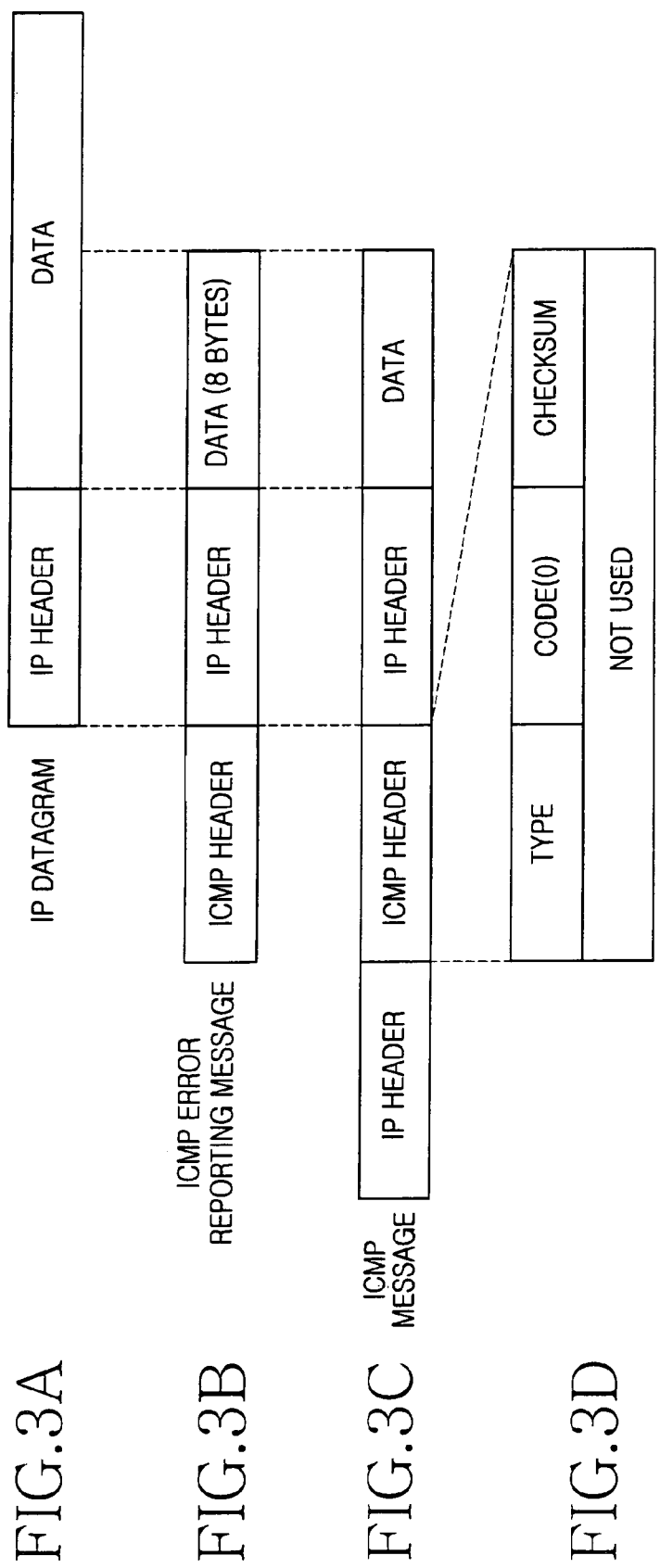

METHOD FOR REPORTING TRANSMISSION STATE BY INTERNET PROTOCOL AND NETWORK USING THE SAME

PRIORITY

This application claims priority to an application entitled "Method for Reporting Transmission State by Internet Protocol and Network Using The Same" filed in the Korean Intellectual Property Office on Nov. 15, 2004 and assigned Serial No. 2004-93081, the contents of which are incorporated herein by reference.

BACKGROUND OF THE INVENTION

1. Field of the Invention

The present invention relates to an Internal Control Message Protocol (ICMP) of an Internet Protocol (IP), and more particularly to a method for reporting a transmission state to a destination by the ICMP of the IP and a network system using the same.

2. Description of the Related Art

Generally, since the Internet Protocol (IP) does not support an error reporting function and an error correction function for transmission of requested datagrams, even when the datagrams fail to normally reach a corresponding destination, the source (of the transmission) cannot recognize the failure of the normal transmission of the datagrams.

Accordingly, the conventional IP employs an Internet control message protocol (ICMP) for feeding back information to the source (which initially transmitted datagrams) about the failure of the normal transmission of the datagrams.

In detail, the ICMP reports information about causes of the failure of the normal transmission to the source, through an error reporting message, which prevented transmission of relevant datagrams, ensuring the transmission of requested diagrams.

However, since the ICMP reports to the source and not to the destination, the destination is not informed of the failure of the normal transmission.

In detail, a recent mobile communication network employs an IS-2000 network together with an IS-95 network, and the IS-2000 network and the IS-95 network have queues of different sizes for transmitting/receiving datagrams. In other words, a packet data serving node (PDSN) (a router of the IS-2000 network) has a queue larger than that of an inter working function (IWF) (a router of the IS-95 network).

Thus, when a terminal capable of suitably transmitting/receiving datagrams for the queue size of the PDSN in the IS-2000 network is used in a service area of the IS-95 network, the IWF of the IS-95 network cannot normally process datagrams transmitted by the terminal.

For this reason, the IWF reports a transmission errors of the datagrams to the terminal of the source based on the ICMP when the IWF cannot normally process the datagrams.

However, it is difficult for a destination terminal to understand the reason of the transmission error without damage of radio data or point-to-point protocol packets, and may degrade a mobile communication network's reliability.

In this case, it is necessary for the manager of the mobile communication network to analyze the entire network in order to determine the cause of the above-described transmission failure problem. However, since the conventional ICMP reports a transmission problem occurring situation to only the source terminal, the destination terminal cannot easily detect transmission states of datagrams.

Accordingly, the destination terminal strongly requires a technique of reporting transmission states of datagrams thereto through the conventional ICMP of the IP in order to enhance the network efficiency and to improve current analysis methods used to analyze the mobile communication network.

SUMMARY OF THE INVENTION

Accordingly, the present invention has been made to solve the above-mentioned problems occurring in the prior art, and it is an object to provide a method for reporting a transmission state by an Internal protocol and a network system using the same, in which an internal control message protocol (ICMP) of the Internet protocol (IP) can report the datagrams not transmitted to a destination of the transmission.

To accomplish the above object, there is provided a method for reporting a transmission state by an Internet Protocol (IP), the method including the steps of determining whether discard of any datagrams occurs, and if the discard of any datagram occurs, obtaining an address of a destination by parsing a discarded datagram, and transmitting an ICMP message for reporting an occurrence of the discard to the address of the destination.

According to another aspect of the present invention, there is provided a network system for reporting a transmission state by an Internet Protocol (IP), the network system including a source for transmitting a datagram, a destination for receiving the datagram, and a router for performing routing between a network and the source or the destination, if discard of any datagram from the source occurs, obtaining an address of the destination by parsing a discarded datagram, and transmitting an ICMP message for reporting an occurrence of the discard to the address of the destination.

BRIEF DESCRIPTION OF THE DRAWINGS

The above and other objects, features and advantages of the present invention will be more apparent from the following detailed description taken in conjunction with the accompanying drawings in which:

FIGS. 3A-3D are views illustrating a structure of a message according to a preferred embodiment of the present invention.

DETAILED DESCRIPTION OF THE PREFERRED EMBODIMENT

Figure 1:
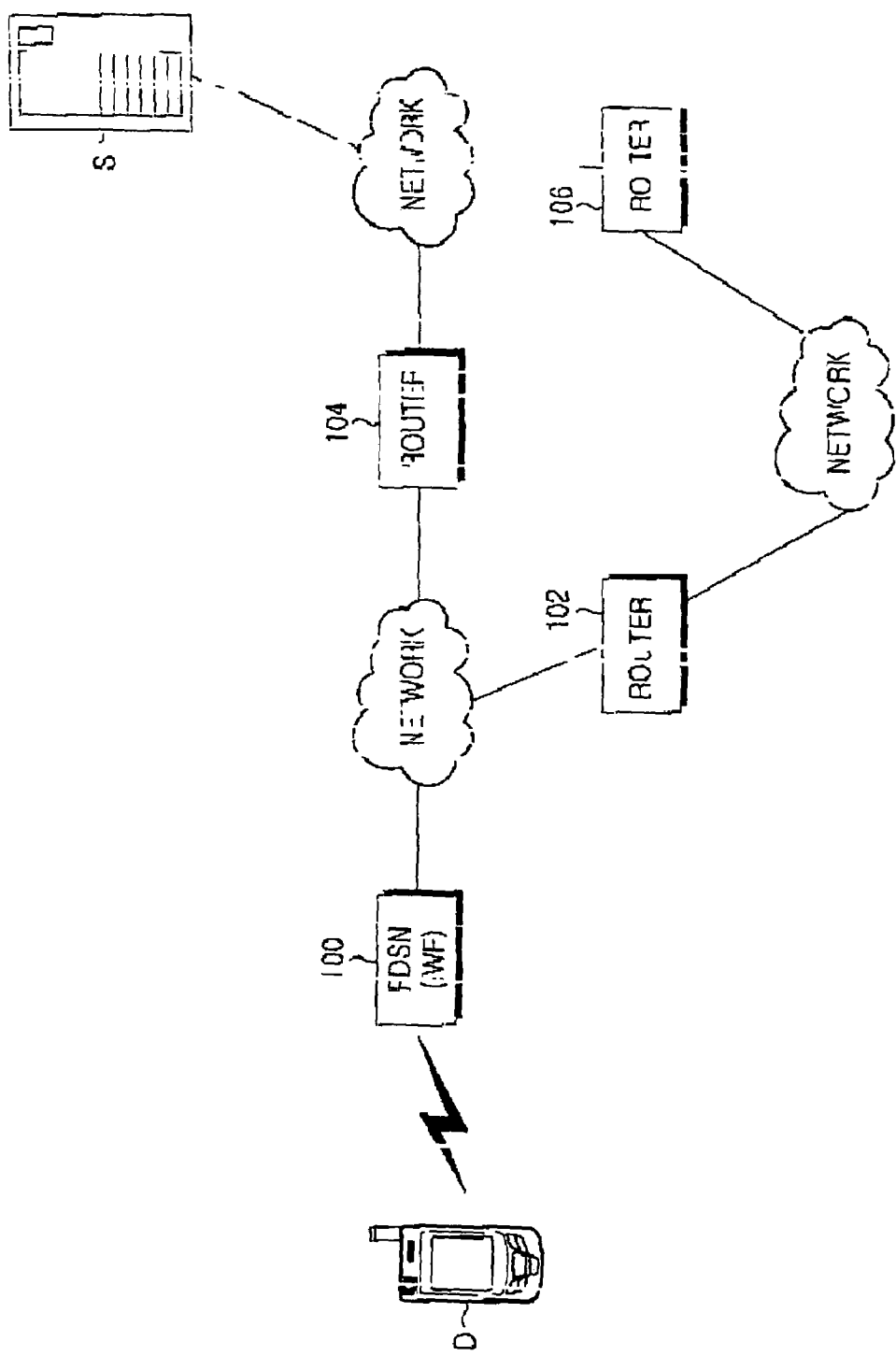
FIG. 1 is a block diagram showing a structure of a network system according to the present invention.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

According to the present invention, when datagrams fail to be normally transmitted, an Internal Control Message Protocol (ICMP) of an Internet Protocol (IP) reports the failure of normal transmission of the datagrams to a destination, thereby enhancing the efficiency IP network management.

Hereinafter, a mobile communication network system according to the present invention will be described with reference to FIG. 1.

A packet data serving node (PDSN) 108 including an IWF 208 connects terminals (D) to a network, and a plurality of routers BC, BSC and MCS (102, 104, and 106, respectively) exchange datagrams with the terminals and connected to the network so as to transmit datagrams from a source terminal to a destination terminal. Also, a server (S) of a service provider for providing various Internet services can be connected to the network.

According to a preferred embodiment of the present invention, when the datagrams from the source terminal are discarded due to an error and/or the overflow of a queue, the PDSN 108 and routers 102, 104, and 106 report the discard of the datagrams to a terminal of the destination as well as the service terminal based on the ICMP.

Figure 2:
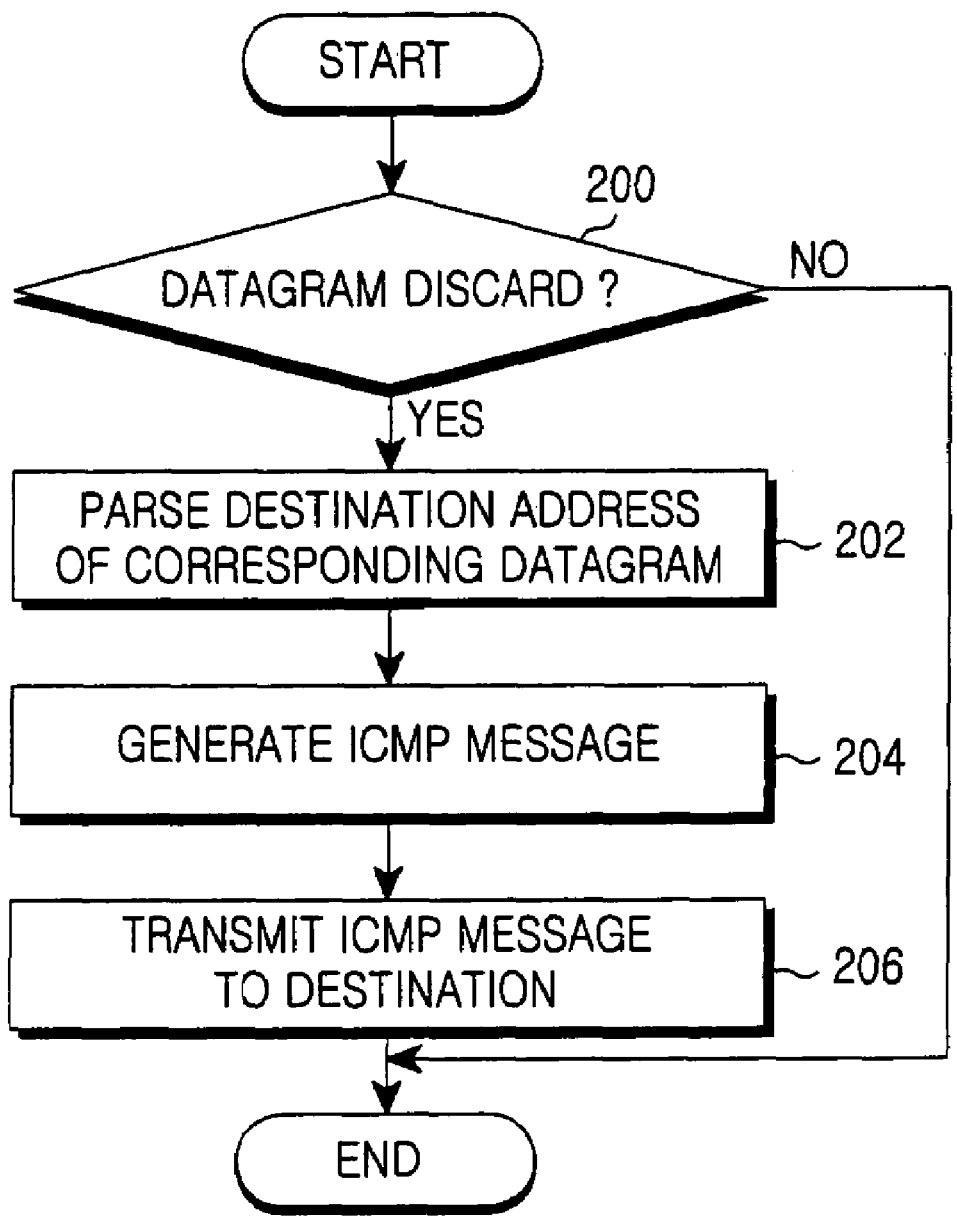
FIG. 2 is a flowchart showing a method for reporting a transmission state according to a preferred embodiment of the present invention.

Hereinafter, a flowchart showing a method for reporting a transmission state according to one embodiment of the present invention applicable to the mobile communication network system will be described with reference to FIG. 2.

The PDSN 108 and the routers 102, 104, and 106 determine whether datagrams provided from an IP network, the terminals, etc. are discarded due to the overflow and error in a queue (step 200).

If the datagrams have been discarded, the PDSN 108 and the routers 102, 104, and 106 obtain the address of the destination by parsing corresponding datagrams in step 202.

If the address of the destination corresponding to the datagrams has been obtained, the PDSN 108 and the routers 102, 104, and 106 generate an ICMP message to be transmitted to the destination in step 204. After the ICMP message to be transmitted to the destination is generated, the PDSN 100 and the routers 102, 104, and 106 transmit the ICMP message to the destination in step 206.

Hereinafter, a method for generating the ICMP message will be described in detail with reference to FIGS. 3A-3D.

An IP datagram includes an IP header and IP data as shown in FIG. 3A. The IP header has the address of the destination, and the PDSN 108 and the routers 102, 104, and 106 obtain the address of the destination by parting the IP datagram.

An IP error reporting message shown in FIG. 3B is formed by adding an ICMP header to the IP datagram and decreasing a size of an IP data field area as much as the size of adding the ICMP header to the IP datagram, and the ICMP header includes a type field, a code field (0), a checksum field, etc. as shown in FIG. 3D.

The ICMP message according to a preferred embodiment of the present invention is formed by adding a new IP header (that is, an IP header including the address of the destination obtained by the PDSN 108 and the routers 102, 104, and 106) to the ICMP error reporting message. Herein, since the ICMP message is a new type of an ICMP message, the type included in the ICMP header is defined as values excluding values of '3', '4', '11', '12', and '5' for reporting errors and values of '8', '0', '13', '14', '17', '18', '10', and '9' for query.

As described above, according to the present invention, the IP of the ICMP informs the destination of datagrams not transmitted to the destination, thereby enhancing the efficiency of an IP manager's analysis.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for reporting a transmission state by an Internet Protocol (IP), the method comprising the steps of:
   determining whether a discard of a datagram has occurred;
   obtaining an address of a destination by parsing a discarded datagram, if the discard of a datagram has occurred; and
   transmitting an Internal Control Message Protocol (ICMP) message for reporting an occurrence of the discard to the address of the destination.

2. The method as claimed in claim 1, wherein the datagram is discarded due to an error and/or an overflow of a router queue.

3. The method as claimed in claim 1, wherein the ICMP message is formed by adding an IP header including the address of the destination to an ICMP error reporting message generated according to the discard.

4. A network system for reporting a transmission state by an Internet Protocol (IP), the network system comprising:
   a source terminal for transmitting a datagram;
   a destination terminal for receiving the datagram; and
   a router for performing routing between a network and the source terminal or the destination terminal,
   wherein if discard of any datagram from the source terminal occurs, obtaining an address of the destination terminal by parsing a discarded datagram, and transmitting an Internal Control Message Protocol (ICMP) message for reporting an occurrence of the discard to the address of the destination terminal.

5. The network system as claimed in claim 4, wherein the datagram is discarded due to an error and/or an overflow of a queue of the router.

6. The network system as claimed in claim 4, wherein the ICMP message is formed by adding an IP header including the address of the destination terminal to an ICMP error reporting message generated according to the datagram discard.

* * * * *